(12) United States Patent
Phelan

(10) Patent No.: US 7,472,092 B2
(45) Date of Patent: Dec. 30, 2008

(54) MONEY ORDER DEVICE WITH IDENTITY VERIFICATION AND METHOD

(76) Inventor: Patricia Phelan, P.O. Box 571442, Dallas, TX (US) 75357

( * ) Notice: Subject to any disclaimer, the term of this patent is extended or adjusted under 35 U.S.C. 154(b) by 0 days.

(21) Appl. No.: 11/867,282

(22) Filed: Oct. 4, 2007

(65) Prior Publication Data

US 2008/0027877 A1 Jan. 31, 2008

Related U.S. Application Data

(60) Continuation-in-part of application No. 10/436,552, filed on May 14, 2003, now Pat. No. 7,280,984, which is a division of application No. 09/567,309, filed on May 8, 2000, now abandoned.

(51) Int. Cl.
*G06F 17/60* (2006.01)
(52) U.S. Cl. .................... 705/76; 705/50; 705/51
(58) Field of Classification Search .............. 705/76, 705/50, 51
See application file for complete search history.

(56) References Cited

U.S. PATENT DOCUMENTS

| 5,193,114 A | 3/1993 | Moseley |
| 5,347,580 A | 9/1994 | Movla et al. |
| 5,455,407 A | 10/1995 | Rosen |
| 5,511,114 A | 4/1996 | Stimson et al. |
| 5,577,109 A | 11/1996 | Stimson et al. |
| 5,671,279 A | 9/1997 | Elgamal |
| 5,673,309 A | 9/1997 | Woynoski et al. |
| 5,696,908 A | 12/1997 | Muehlberger et al. |
| 5,721,781 A | 2/1998 | Deo et al. |
| 5,743,429 A | 4/1998 | Morofsky |
| 5,757,918 A | 5/1998 | Hopkins |
| 5,760,381 A | 6/1998 | Stich et al. |
| 5,777,305 A | 7/1998 | Smith et al. |
| 5,799,087 A | 8/1998 | Rosen |
| 5,870,723 A | 2/1999 | Pare et al. |
| 5,884,292 A | 3/1999 | Baker et al. |
| H1794 H | 4/1999 | Claus |
| 5,894,519 A | 4/1999 | Clemot et al. |

(Continued)

FOREIGN PATENT DOCUMENTS

| JP | 02001056831 A | 2/2000 |
| JP | 02002056831 A * | 2/2001 |

OTHER PUBLICATIONS www.mondex.com-Tech-Prevention, Detection and Recovery—Mondex System, Mondex International Ltd., a subsidiary of MasterCard International, Copyright 1999.

(Continued)

*Primary Examiner*—Pierre E Elisca
(74) *Attorney, Agent, or Firm*—Grady K. Bergen; Griggs Bergen LLP

(57) ABSTRACT

A method of conducting a monetary transaction and system for providing and utilizing a money order device is provided. The method and system utilize a vended money order device that is vended during a vending operation. The money order device is then utilized in a merchant transaction operation. The method and system utilize identity verification information that is transmitted to a clearinghouse during at least one of the vending operation and the merchant transaction operation.

33 Claims, 7 Drawing Sheets

U.S. PATENT DOCUMENTS

| | | |
|---|---|---|
| 5,918,909 A | 7/1999 | Fiala et al. |
| 5,936,221 A | 8/1999 | Corder et al. |
| 5,943,423 A | 8/1999 | Muftic |
| 5,963,648 A | 10/1999 | Rosen |
| 5,987,140 A | 11/1999 | Rowney et al. |
| 5,991,412 A | 11/1999 | Wissenburgh et al. |
| 5,999,625 A | 12/1999 | Bellare et al. |
| 6,003,014 A | 12/1999 | Lee et al. |
| 6,098,053 A | 8/2000 | Slater |
| 6,152,365 A * | 11/2000 | Kolls ........................ 235/381 |
| 6,327,578 B1 | 12/2001 | Linehan |
| 6,332,025 B2 | 12/2001 | Takahashi et al. |
| 6,332,134 B1 | 12/2001 | Foster |
| 6,662,166 B2 | 12/2003 | Pare et al. |

OTHER PUBLICATIONS www.webcertificate.com, Press Release, Web's First Shop-Anywhere Gift Certificate—Webcertificate.com, C/Base, Inc. Oct. 19, 1999.

Logistics, Forbes Magazine, pp. 78-83, Jan. 10, 2000.

http://home3.americanexpress.com/corp/latestnews/seven_eleven. asp—7-Eleven and American Express to Introduce Innovative Kiosks in Dallas/Ft.Worth Area, Jan. 27, 2000, Copyright 1998 American Express Company.

High-tech card fraud goes on right behind your back, pp. 54-56, U.S. News & World Report, Feb. 14, 2000.

Faster, Faster—Companies/TI's signal processors make possible lots of new gifts for gadget geeks, p. 60, Forbes, Mar. 6, 2000.

* cited by examiner

MONEY ORDER DEVICE WITH IDENTITY VERIFICATION AND METHOD

This application is a continuation-in-part of U.S. patent application Ser. No. 10/436,552, filed May 14, 2003, now U.S. Pat. No. 7,280,984, issued Oct. 9, 2007, which is a division of U.S. patent application Ser. No. 09/567,309, filed May 8, 2000, each of which is incorporated by reference in its entirety.

FIELD OF THE INVENTION

The present invention relates generally to the field of electronic monetary transactions.

BACKGROUND

Electronic financial transactions are commonly facilitated using credit cards, debit cards, stored-value cards and smart cards. Despite the technological advancements in electronic commerce, each of these cards have definite disadvantages. For example, electronic commerce on the Internet is primarily facilitated using credit cards. As a result, individuals without credit cards cannot enjoy the convenience, selection and competitive pricing made possible by online shopping. These individuals may not have acceptable credit or may simply be concerned about the security of their financial information on the Internet. In addition, many people prefer cash transactions and frequently use money orders, cashier's checks, traveler's checks or other secure financial documents or instruments. As a result, a large segment of society is essentially excluded from purchasing goods and services via the Internet. In addition, once money orders, cashier's check and traveler's check are issued in a particular currency, they cannot easily be converted to another currency without cashing them for their full value.

One side effect of the boom in Internet commerce is the dramatic increase in the number of goods shipped via delivery services, such as the United States Postal Service, United Parcel Service and Federal Express, among a few. Despite the scope of information available on the Internet, customers are not always exactly sure what they will receive when their package arrives. Accordingly, consumers often would prefer to purchase items by cash on delivery (COD). Internet merchants, however, often require payment by credit card or check (with significant delays in shipment) and do not offer COD as a payment option or make the process so complicated as to make it undesirable by the consumer. Merchants disfavor COD because of the delay in receiving payment from the delivery service. Yet, COD simplifies the return process, is customer friendly and allows the customer to inspect the goods for damage before payment is made to the merchant.

Unlike credit cards, smart cards can be used in many applications. Despite this flexibility and great technological potential, there is little or no standardization for smart card systems. Thus, many different non-compatible smart card systems currently exist. The data storage and multiple application capability of smart cards also provides security concerns. For example, the cardholder does not want his or her doctor to gain access to credit card and bank account information on a smart card that also contains the cardholder's medical history. Similarly, the cardholder does not want his or her bank to gain access to medical history on a smart card that also contains the cardholder's credit card and bank account information.

Moreover, smart cards are not completely invulnerable to failure and loss. For example, a smart card is less resistant to damage from wear and tear, heat, mishandling and contaminants, such as water, dirt, detergent, etc., than a credit card, debit card or magnetic stripe based stored-value card. If the smart card fails, the cardholder typically will lose the amount of money stored on the failed smart card. Similarly, stored-value cards have the disadvantage of losing the monetary value of the card if the card is lost, stolen, damaged or destroyed. Credit cards and debit cards raise other concerns, such as thieves draining bank accounts, running up large credit card charges and/or identity theft before the theft is discovered.

Accordingly, there is a need for a money card system that is convenient, easy to use, does not require good or any credit, is useable by individuals having low incomes, is interchangeable with cash, is available in many currencies, can be used in COD transactions, and is safer than cash, checks, money orders, cashier's checks, traveler's checks, ATM cards, credit cards, debit cards, stored-value cards and smart cards or other forms of monetary exchange generally available to the public.

BRIEF DESCRIPTION OF THE DRAWINGS

The above and further advantages of the invention may be better understood by referring to the following description in conjunction with the accompanying drawings in which corresponding numerals in the different figures refer to corresponding parts in which.

DETAILED DESCRIPTION

Figure 1:
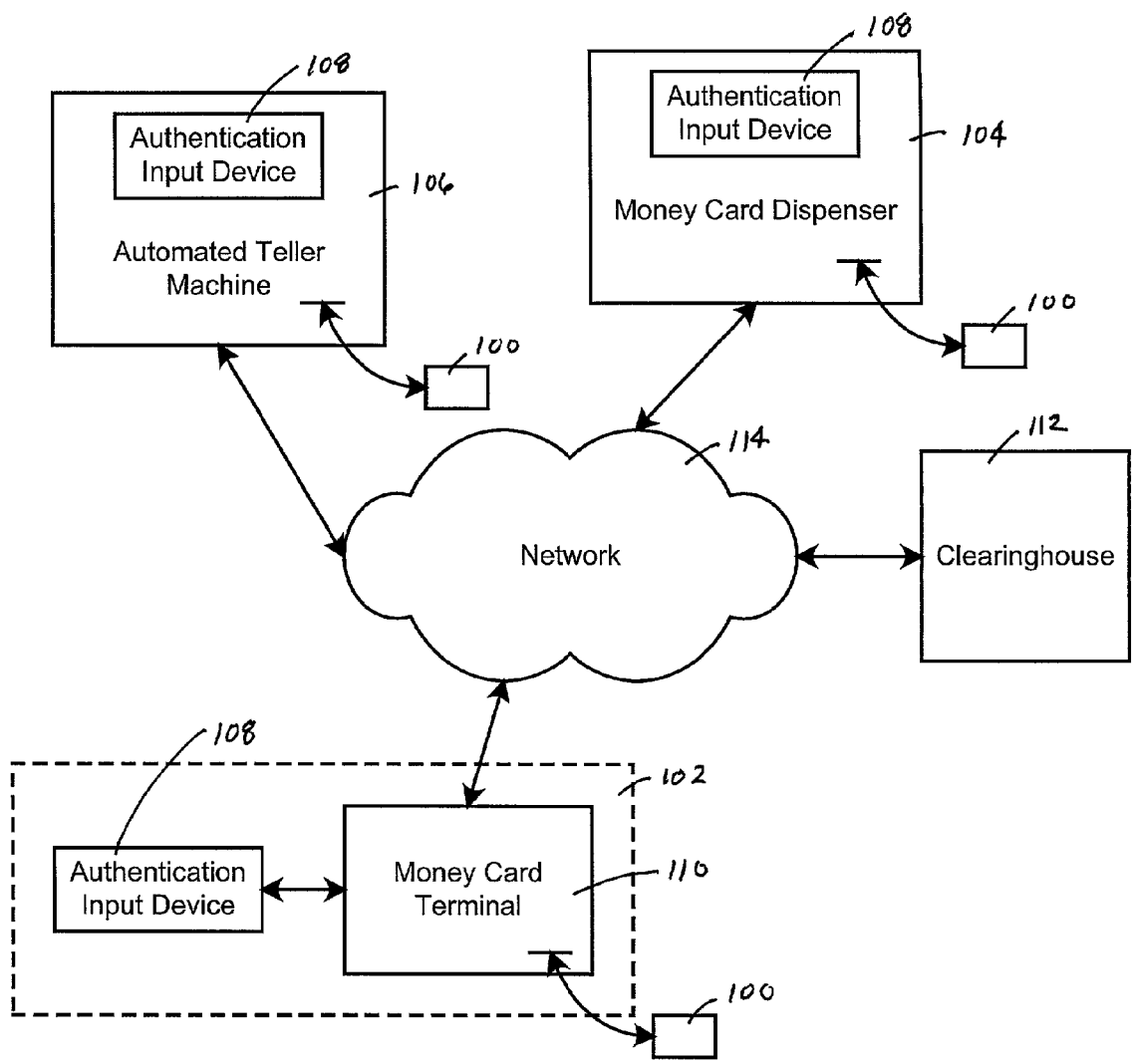
FIG. 1 depicts various ways in which a money card in accordance with the present invention may be acquired.

While the making and using of various embodiments of the present invention are discussed herein in terms of a money card system, it should be appreciated that the present invention provides many applicable inventive concepts which can be embodied in a wide variety of specific contexts. It should be noted that although throughout the description reference is made to a "money card," because this is a particular well suited article that may be employed as a money order device, unless the context suggests otherwise, the expression should be read and interpreted to also include non-card devices or means that can be employed or serve as a money order device, as is described more fully further on. The specific embodiments discussed herein are merely illustrative of specific ways to make and use the invention and does not limit the scope of the invention.

The present invention provides a money card system, method and apparatus that is convenient, easy to use, useable by individuals concerned about Internet security, useable by individuals having bad or no credit, useable by individuals having low incomes, interchangeable with cash, useable in COD transactions, and is safer than cash, checks, money orders, cashier's checks, traveler's checks, ATM cards, credit cards, debit cards, stored-value cards and smart cards. Thus, the present invention can be used as a new medium of exchange for online and on site purchases, provide indiscriminate online access to all consumers with purchasing power, create a more secure form of transaction than cash or credit, fulfill a need for consumers who are unable or unwilling to obtain credit, and facilitate the transfer of funds. The present invention, therefore, allows online merchants to reach markets that were previously untapped.

The present invention provides customer convenience because the money card is prepaid so that the money card can be used as a medium of exchange immediately upon purchase and activation of the money card. The customer does not have to wait as long as two months to find out that he or she has been accepted or denied credit. The money card is ideal for people who do not have the proclivity for filling out credit card applications, individuals with unacceptable credit and teenagers who are unable to obtain credit. According to recent reports, it is estimated that the teenage population in America have a collective purchasing power of approximately $270 billion. Also, twenty percent of households in the United States do not have a checking account. It follows that households that do not have checking accounts would not have credit cards either. Moreover, eighty percent of households in the United States are two paychecks away from subprime.

The present invention does not require the customer to have any credit rating. The present invention is interchangeable with cash and can be dispensed by ATMs in any currency, at the customer's request, instead of cash or in combination with cash. The present invention does not have the same operational restrictions as smart cards. For example, individuals who do not own a personal computer would be able to use a money card to make purchases as many public libraries, colleges, and cyber cafes now provide free use of the Internet.

The present invention is safer than cash or credit cards because if one's cash is lost or stolen it may never be recovered and credit card losses are only protected after the first $50 and are paid by the owner of the card. The present invention provides greater safety than checks, money orders, cashier's checks, traveler's checks or debit cards because there is no endorsement to forge. With debit cards, the customer could incur losses that could equal his or her entire checking account balance. The customer could incur losses greater than his or her account balances if the account has no overdraft protection. With the present invention, the losses are restricted to the available amount associated with the card, provided that the perpetrator knows or guesses the correct Personal Identification Number (PIN) or Personal Identification Code (PIC). Adding one or more biometric scans, such as fingerprint, voiceprint, thermal image, retina or iris scan information, enhances the security feature of the present invention and protects it from fraud. The terms PIN or PIC may be used to collectively include biometric scans or any other type of user authentication means. Additional security may be obtained by buying a money card for the exact amount of one's future purchase. In this instance, the money card would be used one time only and thereby minimize the possibility of someone, other than the owner, from using the money card.

The present invention, therefore, provides a new medium of exchange that can be used on the Internet just like a debit card but without the added risk of divulging a bank account number or credit history. In addition, merchants benefit from an instant payment system via an immediate transfer of funds. Moreover, the clearinghouse benefits from the float immediately upon payment and activation of the money card.

FIG. 1 depicts various ways in which a money card 100 in accordance with the present invention may be acquired. The money card 100 may be purchased from vending agents 102 at retail stores and outlets, convenience stores, check cashing establishments, financial institutions, etc. The money card 100 may also be purchased at stand alone money card dispensers 104 or Automated Teller Machines (ATMs) 106. Each vending location, such as vending agents 102, dispensers 104 or ATMs 106, includes an authentication input device 108. As illustrated with vending agent 102, the authentication input device 108 can be a peripheral device connected to the main money card unit 110.

The money card 100 is preferably sold for a nominal fee and may have either pre-assigned monetary denominations or an assigned monetary value determined by the customer at the time of purchase. The money card 100 is activated upon cash payment by sending the money card number and PIN or PIC to a clearinghouse 112 via a communications network 114. The communications network 114 may be the Internet, public switched telephone network (PSTN), satellite based network or other telecommunications network. The activation process will be described in more detail in reference to FIG. 3. The money card 100 can be issued in any currency or be used to conduct a transaction in a different currency than that of the money card 100 or the account because the conversion is performed by the clearinghouse 112 using the current exchange rates.

Figure 2A:
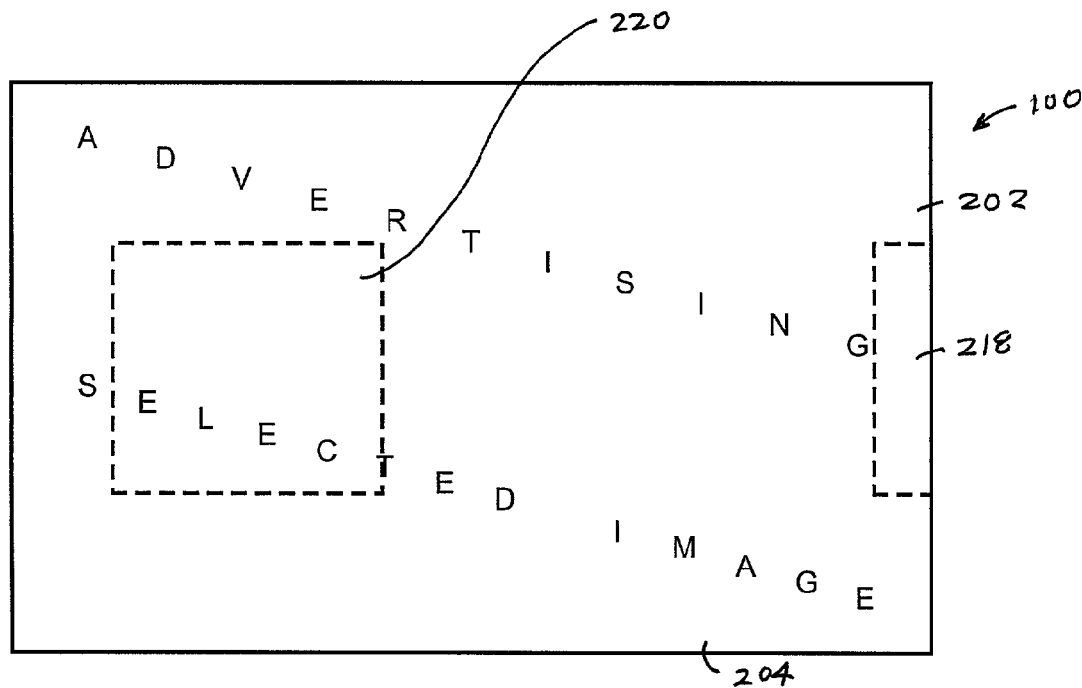
FIGS. 2A and 2B depict a typical money card in accordance with the present invention.
Figure 2B:
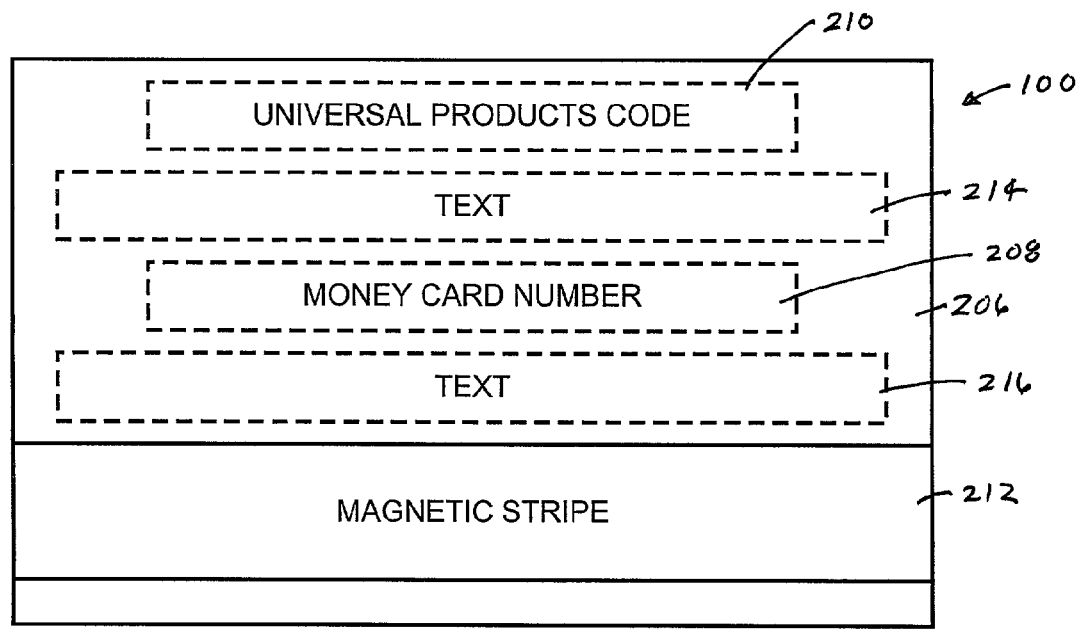

FIGS. 2A and 2B depict a typical money card 100 in accordance with the present invention. More specifically, FIG. 2A depicts the front side 202 of the money card 100 in which advertising or a customer selected image 204 can be printed. FIG. 2B depicts the back side 206 of the money card 100 in which the money card number 208, a Universal Products Code (UPC) symbol 210, a magnetic stripe 212, user instructions 214 and legal notices 216 (such as a disclaimer that advises the customer or user that he agrees to the terms upon purchase or use of the money card) are printed. As will be appreciated by those skilled in the art, the exact orientation of the money card number 208, the UPC symbol 210, the magnetic stripe 212, the user instructions 214 and the legal notices 216 can be changed from that illustrated in FIG. 2B. As a result, the money card 100 may be used by manually entering the money card number 208 using a keypad, scanning the UPC symbol 210 using a wand, or by sliding the magnetic stripe 212 through a card reader. Once the money card 100 is activated, the customer selects a PIN using the authentication input device 108 (FIG. 1) and is encrypted and transmitted electronically to the clearinghouse 112 (FIG. 1) along with the money card number 208 and other pertinent information, such as the economic value of the money card 100, country, state, province, city, vendor location, vendor name, control number, date, and time when the money card 100 was purchased. Should the customer choose to have a Personal Identification Code (PIC) or biometric information to personalize and secure his or her money card 100, that information will also be entered into the authentication input device 108 (FIG. 1) and then encrypted and transmitted to the clearinghouse 112 (FIG. 1).

As the standards and reliability of smart cards improve, the money card 100 could be a smart money card. The present invention could then accommodate both standard and smart money cards. Referring back to FIG. 2A, a typical smart money card includes a number of spaced apart electrical contacts 218 on one surface which provide input and output interfaces with the microcontroller 220 in the card. The contacts 218 may interface with a terminal via ohmic contact, close-coupling, remote-coupling or a combination thereof.

The microcontroller 220 typically includes a microprocessor, card memory including random access memory (RAM), read-only memory (ROM), non-volatile memory, an encryption module, a card reader interface. Other features of the microcontroller 220 may include a clock, a random number generator, interrupt control, control logic, a charge pump, power connections, and the like.

The microprocessor may be any suitable central processing unit for executing commands and controlling the device. RAM serves as storage for calculated results and as a stack memory. ROM stores the operating system, fixed data, standard routines, and look-up tables. Non-volatile memory, such as EPROM or EEPROM, serves to store information that must not be lost when the card is connected to a power source but that must also be alterable to accommodate data specific to individual cards or any changes possible over the card lifetime. This information might include a card identification number, a personal identification number, authorization levels, cash balances, credit limits, etc. The encryption module is an optional hardware module used for performing a variety of encryption algorithms.

Since the smart money card has no power supply of its own, the system startup phase consists of supplying power to the card and performing a "cold" boot to establish communication between the card and terminal. Thereafter, the card and terminal enter an authentication phase where the terminal verifies that it is communicating with an authorized card. This usually entails the smart card forwarding its own access code to the terminal for verification. Following authentication, one or more transactions are conducted and the card is removed from the terminal, ending the session.

Alternatively, the money card 100 can be made using a paper-like material that has the necessary information imprinted on the surface of the money card 100 or stored in a magnetic tape embedded within the money card 100. The money card 100 may also be made of any material that allows information to be stored on it or within it, such as compact discs or holographic discs.

Figure 3:
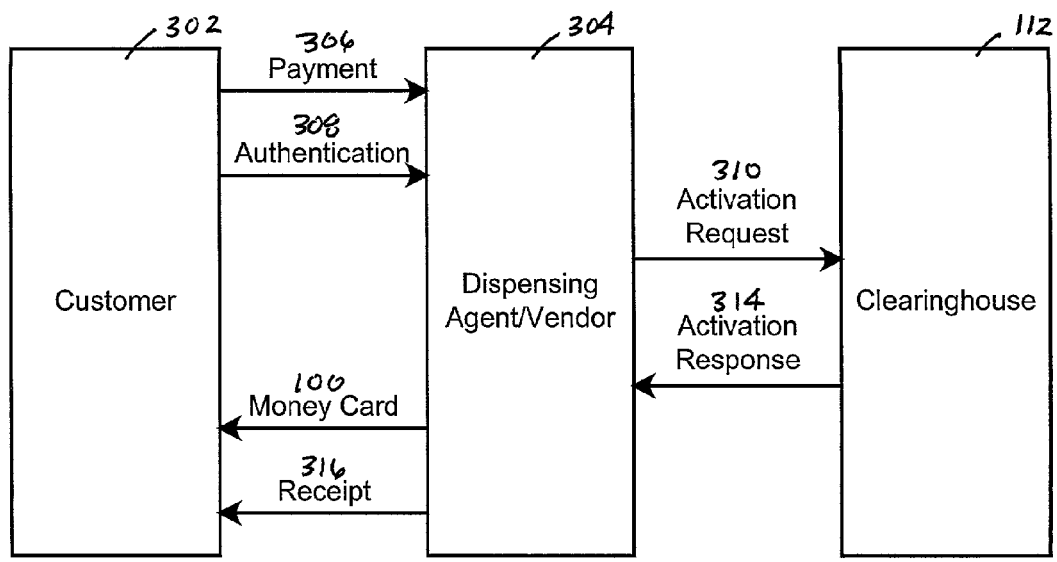
FIG. 3 depicts a money card activation sequence when the money card is purchased from a dispensing agent/vendor in accordance with the present invention.

FIG. 3 depicts a money card 100 activation sequence when a customer 302 purchases the money card 100 from a dispensing agent/vendor 304 in accordance with the present invention. The dispensing agent/vendor 304 may be a vending agent 102 (FIG. 1), a stand alone money card dispenser 104 (FIG. 1) or an ATM 106 (FIG. 1). The customer 302 purchases the money card 100 by tendering the value to be assigned to the money card 100 plus any additional fees and taxes, if any, via payment 306 to the dispensing agent/vendor 304. Payment 306 may be made via a bank account, a credit card, a debit card, another electronic card, currency, or other sources of funds.

The customer 302 then provides the selected authentication 308 to the dispensing agent/vendor 304. As previously described, the selected authentication 308 can take many forms. Preferably, the customer 302 is allowed to choose one or more authentication methods from a list of available authentication options. This allows the customer 302 to select the authentication method that best suits the intended use of the money card 100, addresses the security concerns of the customer 302 and reasonably protects the value of the money card 100. For example, the customer 302 might select both a PIN number and a retina scan or other biometric scan if the money card 100 was intended to represent a large amount of money or was intended to be frequently used. The authentication method selected will also depend on the capabilities of the dispensing device and the availability of those authentication methods at merchants. Thus the present invention can be adapted to provide for newly devised security methods.

Once the customer 302 provides the selected authentication 308 to the dispensing agent/vendor 304, an activation request 310 is transmitted from the dispensing agent/vendor 304 to the clearinghouse 112. The activation request 310 can be encrypted and sent over a public communications network or be sent over a dedicated secure communications link. Once the clearinghouse 112 receives the activation request 310, the data within the activation request 310 will be checked for errors and potential fraud depending on the method of payment. The information included in the activation request 310 may include the money card number, PIN or PIC, the vendor name, vendor number, vendor location, date and time of purchase, the economic value of the money card, control, invoice, or transaction number, and any other data that the clearinghouse 112 deems necessary to conduct the transaction. Upon successful acceptance of the activation request 310, the clearinghouse 112 activates the money card 100 and sends an activation response 314 to the dispensing agent/vendor 304. The activation response 314 indicates that the activation request 310 has been accepted and that the money card 100 has been activated. The dispensing agent/vendor 304 then delivers the money card 100 and a receipt 316 to the customer 302. The receipt 316 may contain sufficient information for the customer 302 to access the value of the money card 100 without actually having the money card 100 present, such as when the money card 100 is lost or stolen or an emergency arises. If, however, there is some problem detected with the activation request 310, the clearinghouse 112 will notify the dispensing agent/vendor 304 of the problem using the activation response 314.

If the dispensing agent/vendor 304 is an ATM, the customer 302 may choose to withdraw funds, either in the form of cash, a money card 100 or a combination of both. Moreover, the customer 302 can insert the money card 100 into the ATM and transfer funds to or from the money card 100 or withdraw funds in the form of cash. The clearinghouse 112 and participating banks can charge transaction fees for these various transactions.

The ATM cards that are primarily in use today consist of magnetic-stripe memory cards that have a single magnetic stripe on one side. The magnetic stripe contains information regarding the bank, the customer 302, and his/her account. To guard against unauthorized access, the customer 320 is also given a multi-digit password or PIN (Personal Identification Number), which is typically four or more digits. The customer 302 inserts the mag-stripe card into the ATM and enters a multi-digit password or PIN. The PIN authenticates for the ATM that the person standing at the ATM is the customer 302 who owns the inserted ATM card (or an authorized person representing the customer 302). The ATM then gives the person a choice of cash, money card 100 or a combination thereof. The ATM's programming and hardware may have to be slightly modified to accommodate the withdrawal of funds in the form of a money card 100. Once the customer 302 chooses to receive his or her funds in the form of a money card 100, the customer's account would be debited, the ATM software would then encode the amount on the magnetic stripe. The ATM would ask the customer 302 for a PIN, PIC or biometric (if the ATM is so equipped) and when he or she finishes entering the PIN, PIC or biometric all the transactional information would be encrypted and transmitted to the clearinghouse 112. Once the clearinghouse 112 receives the information, it would activate the money card 100, inform the ATM that the information has been received and the ATM would dispense the money card 100 to the customer 302. The present invention also allows a customer 302 to add value to an already purchased money card 100 using the same process in which the money card 100 was originally purchased. The customer 302 can perform any of these transactions in any currency.

Figure 4:
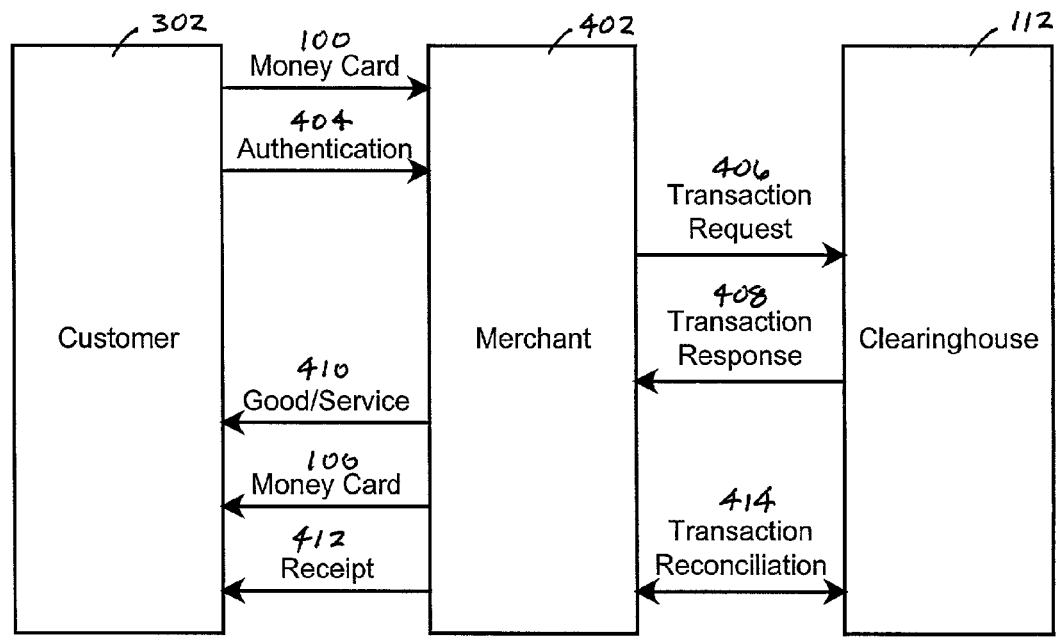
FIG. 4 depicts the use of the money card in a merchant transaction in accordance with the present invention.

FIG. 4 depicts the use of the money card 100 in a merchant transaction in accordance with the present invention. The money card 100 could be used to purchase goods or services 410 at any retailer or merchant 402 that accepts money cards or where a PIN can be input into an entry pad or terminal. When payment is requested, the customer 302 gives the money card 100 to the merchant 402 who will then swipe, scan or enter the money card number 208 (FIG. 2B) into an entry pad or terminal. The customer 302 would then be prompted for his or her PIN 404. The money card number 208 (FIG. 28), PIN and sales amount would be transmitted to the clearinghouse 112 in a transaction request 406, which is preferably encrypted or sent over a secure communication link. The clearinghouse 112 then verifies and processes the transaction request 406 and either approves or disapproves the transaction via a transaction response 408. If the money card 100 did not have sufficient funds to cover the transaction amount or there was an error in authentication, the entry pad screen would indicate the balances needed to complete the transaction or the applicable error message. In the case where the money card 100 did not have sufficient funds, the entry pad screen may ask the customer 302 the following questions:

How do you wish to complete this transaction?
1. Cash.
2. Check.
3. Debit card.
4. Credit card.
5. A new money card.

If the customer 302 chooses Option 5, "A new money card," the process would begin again where the customer's new money card (not shown) would be swiped, scanned or entered into an entry pad or terminal. The process would continue until the amount needed to pay the merchant 402 is met. Then, any credit balance left on the last money card 100 used would be indicated by a prompt on the screen that would say "Credit Balance Remaining. Would you like to see the amount on the screen? Or would you like a receipt?" The customer 302 would select one of these options and merchant 402 will give the goods or services 410, the money card 100 and a receipt 412, containing such information as the credit balance and money card number 208 (FIG. 2B), to the customer 302. The clearinghouse 112 would release and transfer the funds to the merchant 402 via a transaction reconciliation process 414, thus completing the transaction.

If the customer 302 uses only one money card 100 to pay for his purchase and its economic value exceeds the sales amount, then the credit balance on the money card 100 would be indicated by a prompt on the screen that would say "Credit Balance Remaining. Would you like to see the amount on the screen? Or would you like a receipt?" The customer 302 would select an option and the clearinghouse 112 would release and transfer the funds to the merchant 402, the credit balance and money card number 208 (FIG. 2B) would be either displayed or printed on a receipt 412 and the transaction would be complete.

Figure 5:
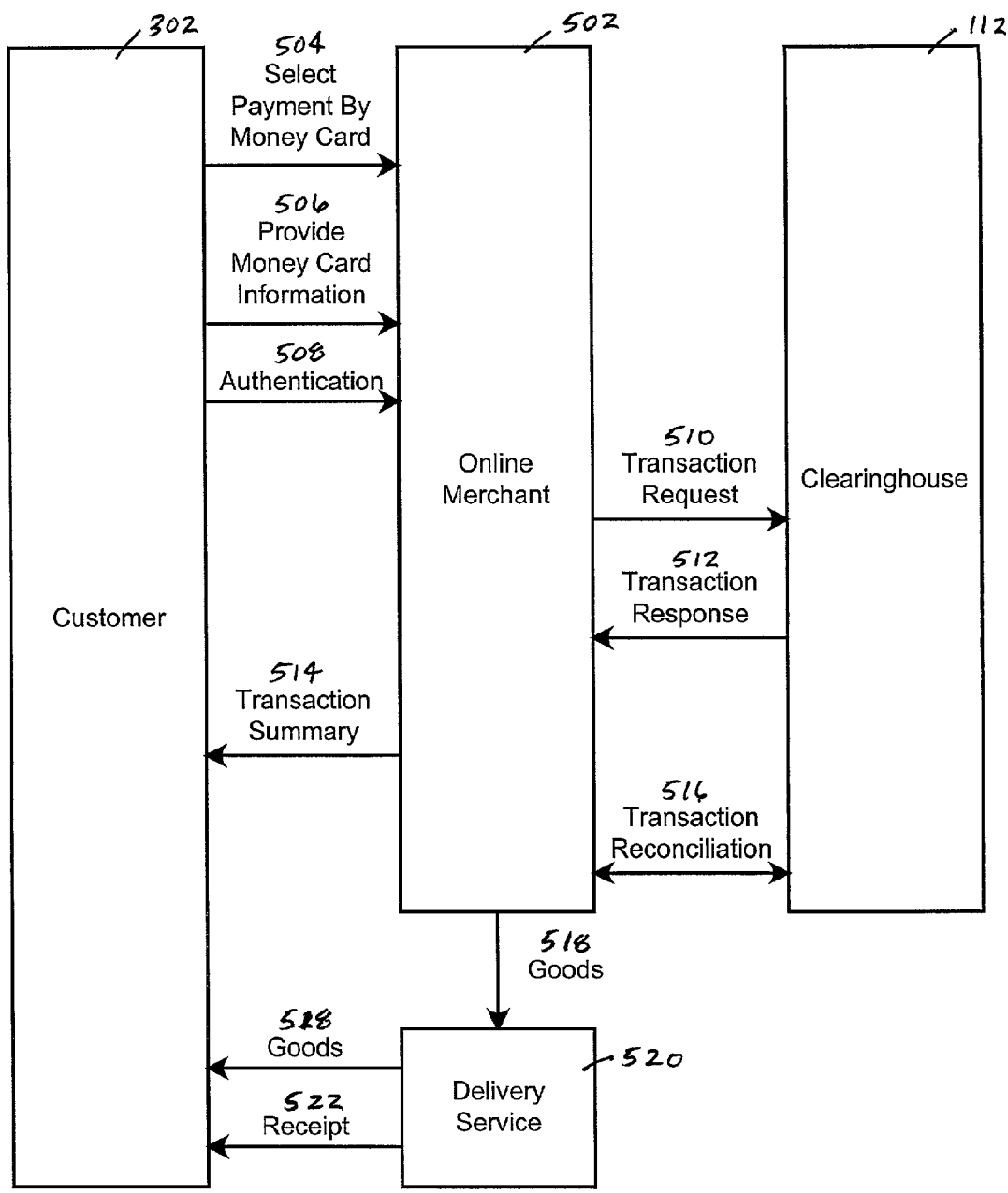
FIG. 5 depicts the use of the money card in an online transaction in accordance with the present invention.

FIG. 5 depicts the use of the money card 100 in an online transaction in accordance with the present invention. The customer 302 would visit an online merchant 502 to make a purchase and when the payment options are displayed, he or she would select "Money Card" 504. The customer 302 then submits his or her money card number(s) 208 (FIG. 2B) via a magnetic stripe reader, UPC scanner, or manual entry via communication 506. The customer 302 would then enter his or her PIN(s) manually or if the computer or terminal is equipped, he would provide his PIC or biometric information 508. The authentication information 508 would be encrypted and transmitted to the merchant 502, who would attach the sales amount and his control number(s) or identification to the encrypted file and send the entire encrypted transaction request 510 to the clearinghouse 112. The control number(s) would be a transaction-specific sequence of numbers such as an invoice number or any other means of identification that the merchant 502 or clearinghouse 112 deem appropriate. Because the money card number(s) and PIN(s) are encrypted, the merchant 502 would not know the value of the cards and the customer 302 would be protected from an unscrupulous merchant 502 using any remaining credit balance.

When the clearinghouse 112 receives the money card number(s) 208 (FIG. 2B) and PIN(s), it would also receive the dollar amount of the transaction, thus when it releases the funds, it would know how much of the funds to release to the merchant 502. Any credit balance remaining to the customer 302 would be indicated in a transaction response 512 from the clearinghouse 112. The customer 302 would also be advised that the other cards used in the transaction had exhausted their economic value and were no longer valid. The customer 302 would be advised to print the screen containing his money card number and remaining credit balance in a transaction summary 514. The clearinghouse 112 would release and transfer the funds to the merchant 502 via a transaction reconciliation process 516, thus completing the transaction. The merchant 502 will then send the goods 518 to the customer 302 via a delivery service 520, such as the United States Postal Service, United Parcel Service, Federal Express, etc. The customer 302 then receives the goods 518 from the delivery service 520. The customer 302 also receives a receipt 522 which may be provided by the delivery service 520 or be packed with the goods 518 by the merchant 502. As will be described in reference to FIG. 7, if the customer 302 should lose the printout which contains his or her money card number and credit balance, the customer 302 can call the clearinghouse's telephone number, which may be a toll free number, that appears on the money card 100 or the customer 302 can visit the clearinghouse's website and get his or her remaining balance by entering each money card number(s) 208 (FIG. 2B) and corresponding PIN(s).

Figure 6:
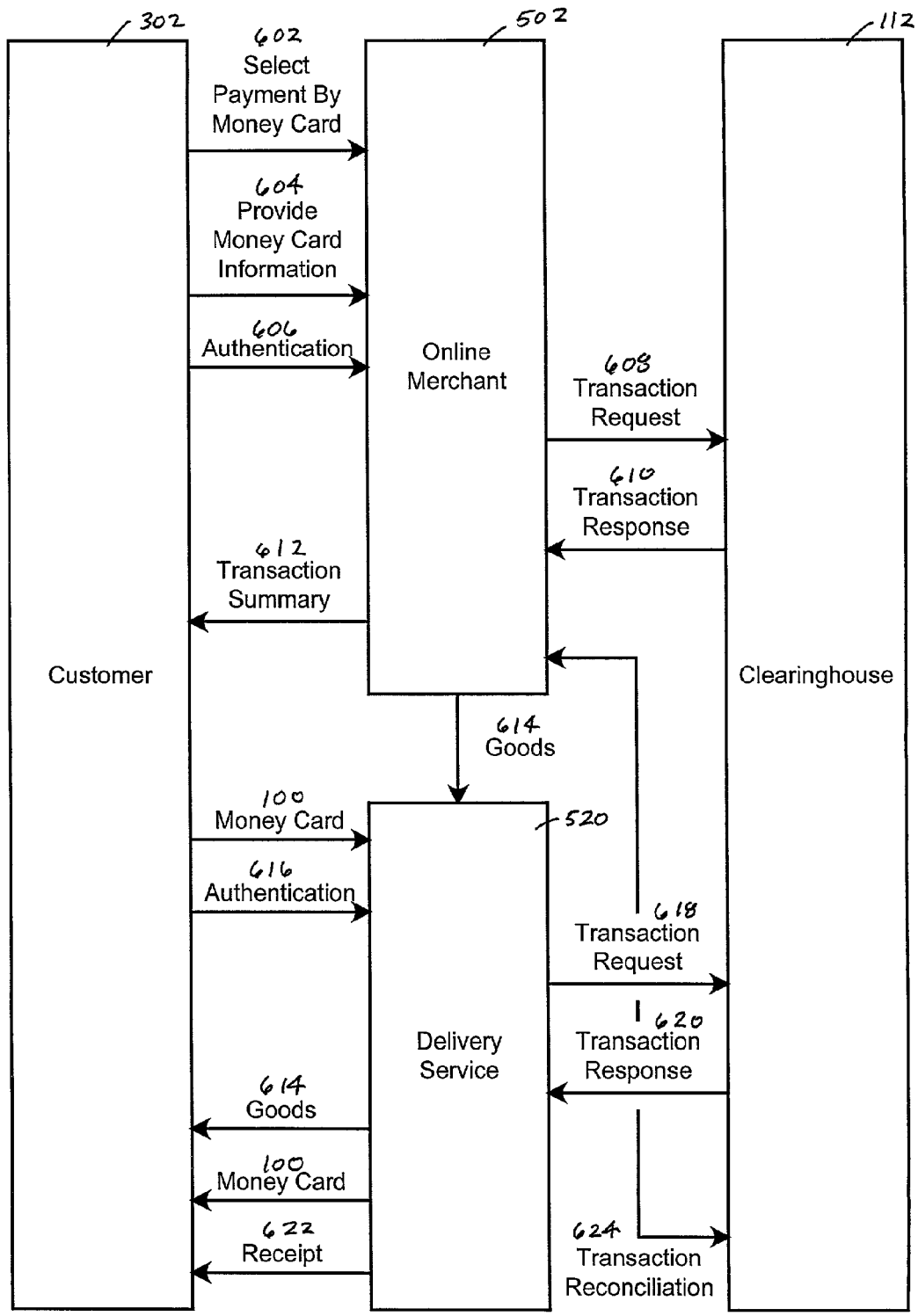
FIG. 6 depicts the use of the money card in a COD transaction in accordance with the present invention.

FIG. 6 depicts the use of the money card 100 in a COD transaction in accordance with the present invention. Should the customer 302 prefer to pay for the goods purchased online upon delivery, he or she would select the payment option "Money Card—C.O.D." 602. The customer 302 would then enter his money card information and authentication information, which would be encrypted and sent to the merchant 502 in messages 604 and 606. The merchant 502 takes messages 604 and 606 and adds the total transaction amount and the merchant's control number(s) to make a transaction request 608, which is encrypted and transmitted to the clearinghouse 112. The control number could be an invoice number, transaction number, taxpayer identification number or any other means of identification that the merchant 502 and/or clearinghouse 112 deem appropriate. The transaction request 608 may also include a restocking fee or deposit fee which is designed to detract individuals from ordering goods who might not intend to pay for them when they are delivered. The restocking charge would be charged against the money card 100 only in the event the customer 302 refuses the goods 614. Thus the restocking fee is a deposit that would be credited to the customer's account upon acceptance of the goods 614. The clearinghouse 112 would verify to the merchant 502 the availability of the funds and upon the merchant's request 608, block their usage, including the restocking fee, for a predetermined period. The amount of time that the funds would be blocked from being used by the customer 302 would be specified in the customer/merchant C.O.D. agreement terms on the website. The clearinghouse 112 would not release the funds to the merchant 502 at this time.

The merchant 502 would ship the goods 614 to the customer 302 via a delivery service 520. The merchant 502 may also send the package tracking number issued by the delivery service 520 to the clearinghouse 112 to be used as additional authentication when the customer 302 receives the goods 614 and authorizes payment. Upon receipt of the goods 614 by the customer 302, the customer 302 will provide the shipper with the customer's money card 100 and authentication information 616. The delivery service 520 would swipe, scan or enter each money card number 208 (FIG. 2B) on a mobile unit. The mobile unit is typically a hand-held device that contains a transceiver. Information is relayed through the delivery service network and ultimately to the clearinghouse 112. The delivery persons receive, validate and securely transmit money card payments to the merchant from the point of delivery.

After each money card number, the customer 302 would enter the corresponding PIN(s) on an entry pad or terminal. The information would be encrypted and sent to the clearinghouse 112 in a transaction request 618. The clearinghouse 112 will compare the money card number(s) 208 (FIG. 2B) and PIN(s) provided by the customer 302 to the merchant 502 with those given to the delivery service 520 and when verified, will release the funds to the merchant 502 in a transaction reconciliation process 624. The clearinghouse 112 would also send an approval in the form of a transaction response 620 to the delivery service 520, indicating the amount approved, and the goods 614 would be released to the customer 302. If a credit balance amount should exist, the screen would display the credit balance amount along with the corresponding money card number 208 (FIG. 2B) on the shipper's mobile unit. The delivery service 520 would be advised to print the screen containing the money card number 208 (FIG. 2B) and remaining credit balance for the customer 302 in a receipt 622, if the delivery service equipment has the capability. Otherwise, the customer 302 would be advised to write down the money card number and remaining balance for his records. The money card 100 is also returned to the customer 302. If the customer 302 refuses the goods 614, the delivery service 520 would send a message (not shown) to the clearinghouse 112 indicating to the effect. The clearinghouse 112 would unblock the customer's funds, except for the restocking fee and informs the merchant 502 that the goods 614 have been refused and credits the merchant's account with the restocking fee. As will be described in reference to FIG. 7, if the customer 302 should lose the information which contains his money card number 208 (FIG. 2B) and credit balance, he would call the clearinghouse's telephone number, which may be a toll free number, that would appear on the money card 100 or he could visit their website and get his remaining balance by entering each money card number(s) 208 (FIG. 2B) and corresponding PIN(s).

The most secure way for a customer 302 to pay his bills/fees/fines or any purchase or transaction with a money card 100, would be for the customer 302 to log on to the payee's website and find out the total amount that he owes. Then, the customer 302 would purchase a money card 100 for the EXACT amount and use it only ONCE to pay his balance due. The customer 302 would visit the utility company's or government agency's website and when the payment options are displayed, the customer 302 would select "Money Card." The customer 302 would then enter his money card number(s) 208 (FIG. 2B) and his PIN(s) which would be encrypted and transmitted to the clearinghouse 112 along with the amount due and the utility company or government agency's control or identification number(s). Because the money card number(s) 208 (FIG. 2B) and PIN(s) would be encrypted, the utility company or government agency would not know the value of the card(s) and the customer 302 would be protected from an unscrupulous employee using his remaining credit balance, if any. When the clearinghouse 112 receives the money card number(s) 208 (FIG. 2B) and PIN(s), it would also receive the dollar amount of the transaction, thus when it releases the funds, it would know how much of the funds to release to the utility company or government agency. Any credit balance remaining to the customer 302 would be indicated in a message from the clearinghouse 112. The customer 302 would also be advised that the other cards used in the transaction had exhausted their economic value and were no longer valid. The customer 302 would be advised to print the screen containing his or her money card number 208 (FIG. 2B) and remaining credit balance. As will be described in reference to FIG. 7, if the customer 302 should lose the printout which contains his money card number 208 (FIG. 2B) and credit balance, he or she would call the clearinghouse's telephone number, which may be a toll free number, that would appear on the money card 100 or the customer 302 could visit their website and get his or her remaining balance by entering each money card number(s) 208 (FIG. 2B) and corresponding PIN(s).

A money card 100 would be used as cash or cashed anywhere that a participating clearinghouse 112 exists. The customer 302 would send the money card 100 to someone, then separately, the customer 302 would send the PIN or PIC by mail, email or communicate it with a telephone call or any other means of communication the customer 302 chooses. The receiving party or person in possession of the money card number 208 (FIG. 2B) and PIN would be able to utilize the money card 100 immediately.

Figure 7:
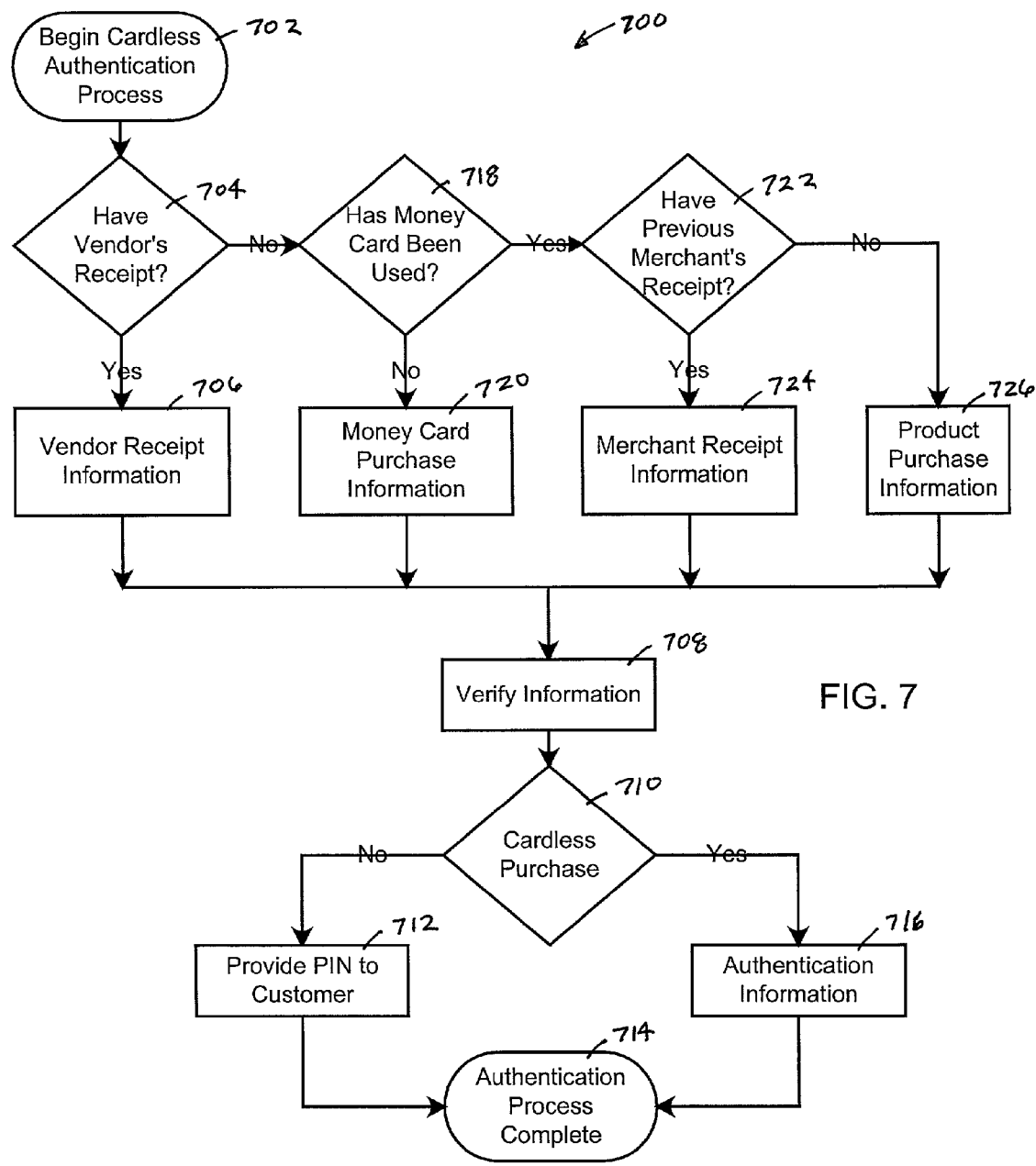
FIG. 7 depicts a cardless authentication process in accordance with the present invention.

FIG. 7 depicts a cardless authentication process in accordance with the present invention, which is generally denoted as 700. The customer's receipt would have the money card number 208 (FIG. 2B) printed on it and should the customer 302 (FIGS. 3-6) lose the money card 100, he or she would still be able to make a purchase as long as the customer 302 (FIGS. 3-6) remembers his or her PIN and has his or her receipt. If a PIC or biometric was used to secure the money card, and the money card 100 was subsequently lost, the customer 302 (FIGS. 3-6) would go to a dispensing agent's location, fill out a lost/stolen information sheet, and provide a PIC or biometric which would be compared to the existing one on file. The customer 302 (FIGS. 3-6) may request the issuance of a replacement money card 100 for a fee. Should the customer 302 (FIGS. 3-6) forget his PIN but still possess the money card number, he or she would go to the clearinghouse's website or call the clearinghouse's telephone number, which may be a toll free number. If the customer 302 (FIGS. 3-6) goes to the website, he or she would click on the lost/stolen money card icon and answer the following questions pertaining to his specific situation.

The cardless authentication process begins in block 702. The customer 302 (FIGS. 3-6) is queried as to whether he or she has the vendor's receipt in decision block 704. If the answer is yes, the customer 302 (FIGS. 3-6) is asked to provide relevant vendor receipt information in block 706. The vendor receipt information may include:

1. Country where money card 100 was purchased.
2. State where money card 100 was purchased.
3. City where money card 100 was purchased.

4. Location where money card 100 was purchased, which may be a street address, shopping center name or a more generalized location.
5. Vendor Name where money card 100 was purchased.
6. Exact date when money card 100 was purchased.
7. Exact time when money card 100 was purchased.
8. Original money card value at the time of purchase.
9. Control, transaction, or invoice number.
10. Money card number 208 (FIG. 2B).
11. Money card 100 currency type.

The number of questions asked will typically depend on the security level assigned to the money card 100 when it was purchased or be based on the value of the money card 100. After the questions have been answered, the clearinghouse 112 verifies the information in block 708 and determines whether the process should proceed.

If the customer 302 (FIGS. 3-6) has initiated this process as a cardless purchase, as determined in block 710, the customer 302 (FIGS. 3-6) is required to provide his or her authentication information (PIN, PIC or biometric information) in block 716. If the authentication information is correct, the authentication process is then complete in block 714 and the transaction is completed as previously described. If, however, the customer 302 (FIGS. 3-6) has not initiated this process as a cardless purchase and has instead lost his or her PIN, as determined in block 710, the clearinghouse 112 provides the PIN to the customer 302 (FIGS. 3-6) in block 712. The authentication process is then complete in block 714.

If the customer 302 (FIGS. 3-6) does not have the vendor's receipt as determined in block 704, the customer is queried as to whether he or she has used the money card 100 since it was purchased in block 718. If the answer is no, the customer 302 (FIGS. 3-6) is asked to provide relevant money card purchase information in block 720. The money card purchase information may include:
1. Country where it was purchased.
2. State where it was purchased.
3. City where money card 100 was purchased.
4. Location where money card 100 was purchased, which may be a street address, shopping center name or a more generalized location.
5. Vendor Name where money card 100 was purchased.
6. Date when money card 100 was purchased.
7. Approximate time when money card 100 was purchased (parameters would be provided by the clearing house).
8. Original money card 100 value at the time of purchase.
9. Money card 100 currency type, such as American or Canadian dollars, pesos, pounds, yen, marks, francs, euro dollars, etc.

The number of questions asked will typically depend on the security level assigned to the money card 100 when it was purchased or be based on the value of the money card 100. After the questions have been answered, the clearinghouse 112 verifies the information in block 708 and determines whether the process should proceed.

If the customer 302 (FIGS. 3-6) has initiated this process as a cardless purchase, as determined in block 710, the customer 302 (FIGS. 3-6) is required to provide his or her authentication information (PIN, PIC or biometric information) in block 716. If the authentication information is correct, the authentication process is then complete in block 714 and the transaction is completed as previously described. If, however, the customer 302 (FIGS. 3-6) has not initiated this process as a cardless purchase and has instead lost his or her PIN, as determined in block 710, the clearinghouse 112 provides the PIN to the customer 302 (FIGS. 3-6) in block 712. The authentication process is then complete in block 714.

If the customer 302 (FIGS. 3-6) has used the money card 100 as determined in block 718, the customer is queried as to whether he or she has the previous merchant's receipt in block 722. If the answer is yes, the customer 302 (FIGS. 3-6) is asked to provide relevant merchant receipt information in block 724. The merchant receipt information may include:
1. Country where money card 100 was last used. State or province where money card 100 was last used.
2. City where money card 100 was last used.
3. Location or website address where money card 100 was last used.
4. Merchant's Name where money card 100 was last used.
5. Date when money card 100 was last used.
6. Time when money card 100 was last used.
7. Original money card value at the time of purchase.
8. Control, transaction, or invoice number.

The number of questions asked will typically depend on the security level assigned to the money card when it was purchased or be based on the value of the money card 100. After the questions have been answered, the clearinghouse 112 verifies the information in block 708 and determines whether the process should proceed.

If the customer 302 (FIGS. 3-6) has initiated this process as a cardless purchase, as determined in block 710, the customer 302 (FIGS. 3-6) is required to provide his or her authentication information (PIN, PIC or biometric information) in block 716. If the authentication information is correct, the authentication process is then complete in block 714 and the transaction is completed as previously described. If, however, the customer 302 (FIGS. 3-6) has not initiated this process as a cardless purchase and has instead lost his or her PIN, as determined in block 710, the clearinghouse 112 provides the PIN to the customer 302 (FIGS. 3-6) in block 712. The authentication process is then complete in block 714.

If the customer 302 (FIGS. 3-6) does not have the previous merchant's receipt as determined in block 722, the customer 302 (FIGS. 3-6) is asked to provide relevant product purchase information in block 726. The product purchase information may include:
1. Country where money card 100 was last used.
2. State or province where money card 100 was last used.
3. City where money card 100 was last used.
4. Location or website address where money card 100 was last used.
5. Merchant's Name where money card 100 was last used.
6. Date when money card 100 was last used.
7. Approximate time when money card 100 was last used (parameters would be provided by the clearinghouse).
8. Original money card value at the time of purchase.

The number of questions asked will typically depend on the security level assigned to the money card when it was purchased or be based on the value of the money card 100. After the questions have been answered, the clearinghouse 112 verifies the information in block 708 and determines whether the process should proceed.

If the customer 302 (FIGS. 3-6) has initiated this process as a cardless purchase, as determined in block 710, the customer 302 (FIGS. 3-6) is required to provide his or her authentication information (PIN, PIC or biometric information) in block 716. If the authentication information is correct, the authentication process is then complete in block 714 and the transaction is completed as previously described. If, however, the customer 302 (FIGS. 3-6) has not initiated this process as a cardless purchase and has instead lost his or her PIN, as determined in block 710, the clearinghouse 112 provides the PIN to the customer 302 (FIGS. 3-6) in block 712. The authentication process is then complete in block 714.

The clearinghouse 112 may utilize the aforementioned sequence of questions, a combination thereof, or any other pertinent data that the clearinghouse 112 deems necessary. These questions should be presented individually and in a random order by the clearinghouse 112 to lessen the likelihood that perpetrators would outguess the system. The aforementioned questions are just a sampling of what the clearinghouse 112 could ask the customer 302 (FIGS. 3-6) who does not have his PIN. Additionally, the clearinghouse 112 should also consider increasing the number of questions as the dollar amount of the money card 100 increases.

If the money card 100 was secured with a biometric and subsequently lost, the customer 302 (FIGS. 3-6) would provide the biometric at a dispensing agent location 304 (FIG. 3) where the lost money card number would be once again revealed to the customer 302 (FIGS. 3-6) for a nominal fee.

After answering the sequence of questions, if the information that the customer 302 (FIGS. 3-6) provided is correct, his or her card number would appear on the screen and he or she could still use his money card 100 to make purchases. Should the information provided be incorrect, the customer 302 (FIGS. 3-6) would get two more attempts at retrieving his money card number 208 (FIG. 2B). After three failed attempts, or any number the clearinghouse 112 deems appropriate, the customer 302 (FIGS. 3-6) would be informed that the information he or she provided was invalid and would be disconnected. At this time, the clearinghouse 112 would preclude the customer 302 (FIGS. 3-6) from any further attempts at retrieving the PIN and "red flag" the corresponding money card number on its system. The customer 302 (FIGS. 3-6) would then be advised to visit a dispensing agent in person and provide proper identification. If the customer 302 (FIGS. 3-6) calls the clearinghouse's telephone number, he or she would have to answer the same information. Money cards would expire twelve (12) months after they had been activated, a time period specified in the customer/merchant agreement terms, or a time period specified by the law.

Figure 8:
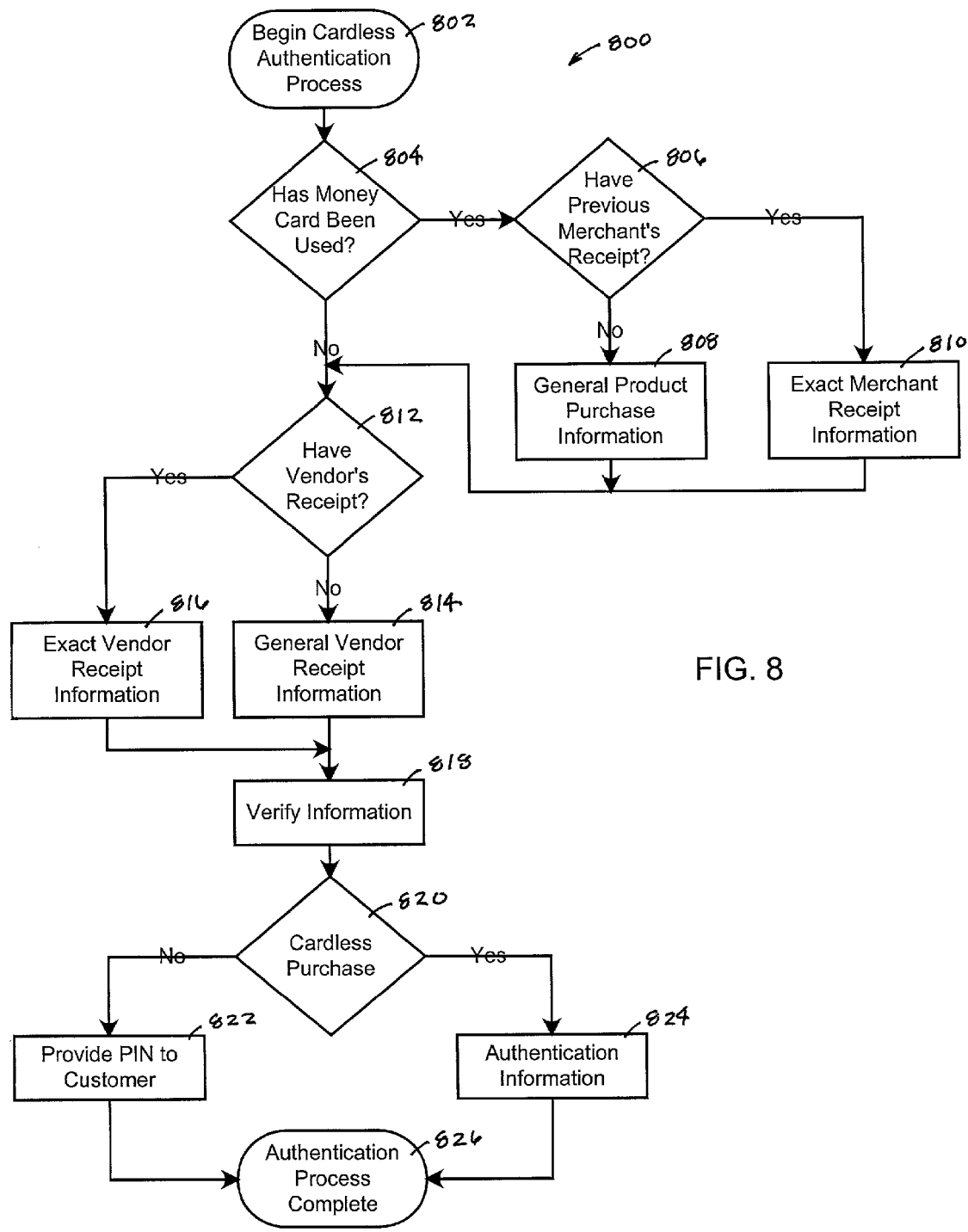
FIG. 8 depicts another cardless authentication process in accordance with the present invention.

FIG. 8 depicts another cardless authentication process in accordance with the present invention, which is generally denoted as 800. The customer's receipt would have the money card number printed on it and should the customer 302 (FIGS. 3-6) lose the money card 100, he or she would still be able to make a purchase as long as the customer 302 (FIGS. 3-6) remembers his or her PIN and has his or her receipt. If a PIC or biometric was used to secure the money card 100, and the money card 100 was subsequently lost, the customer 302 (FIGS. 3-6) would go to a dispensing agent's location 304 (FIG. 3), fill out a lost/stolen information sheet, and provide a PIC or biometric which would be compared to the existing one on file. Should the customer 302 (FIGS. 3-6) forget his PIN but still possess the money card number, he or she would go to the clearinghouse's website or call the clearinghouse's telephone number, which may be a toll free number. If the customer 302 (FIGS. 3-6) goes to the website, he or she would click on the lost/stolen money card icon and answer the following questions pertaining to his specific situation.

The cardless authentication process begins in block 802. The customer 302 (FIGS. 3-6) is queried as to whether he or she used the money card 100 since it was purchased in block 804. The customer 302 (FIGS. 3-6) is then queried as to whether he or she has the previous merchant's receipt in block 806. If the customer 302 (FIGS. 3-6) does not have the previous merchant's receipt as determined in block 806, the customer 302 (FIGS. 3-6) is asked to provide relevant product purchase information in block 808. The product purchase information may include:

1. Country where money card 100 was last used.
2. State or province where money card 100 was last used.
3. City where money card 100 was last used.
4. Location or website address where money card 100 was last used.
5. Merchant's Name where money card 100 was last used.
6. Date when money card 100 was last used.
7. Approximate time when money card 100 was last used (parameters would be provided by the clearinghouse).
8. Original money card value at the time of purchase.

The number of questions asked will typically depend on the security level assigned to the money card when it was purchased or be based on the value of the money card 100. If, however, the customer 302 (FIGS. 3-6) does have the previous merchant's receipt as determined in block 806, the customer 302 (FIGS. 3-6) is asked to provide relevant merchant receipt information in block 810. The merchant receipt information may include:

1. Country where money card 100 was last used.
2. State or province where money card 100 was last used.
3. City where money card 100 was last used.
4. Location or website address where money card 100 was last used.
5. Merchant's Name where money card 100 was last used.
6. Date when money card 100 was last used.
7. Time when money card 100 was last used.
8. Original money card value at the time of purchase.
9. Control, transaction, or invoice number.

The number of questions asked will typically depend on the security level assigned to the money card when it was purchased or be based on the value of the money card 100.

If the money card 100 has not been used, as determined in block 804, or the general product purchase information has been properly entered in block 808, or the exact merchant receipt information has been properly entered in block 810, the customer is queried as to whether he or she has the vendor's receipt in block 812. If the answer is yes, the customer 302 (FIGS. 3-6) is asked to provide relevant vendor receipt information in block 816. The vendor receipt information may include:

1. Country where money card 100 was purchased.
2. State where money card 100 was purchased.
3. City where money card 100 was purchased.
4. Location where money card 100 was purchased, which may be a street address, shopping center name or a more generalized location.
5. Vendor Name where money card 100 was purchased.
6. Exact date when money card 100 was purchased.
7. Exact time when money card 100 was purchased.
8. Original money card value at the time of purchase.
9. Control, transaction, or invoice number.
10. Money card number 208 (FIG. 2B).
11. Money card 100 currency type.

The number of questions asked will typically depend on the security level assigned to the money card when it was purchased or be based on the value of the money card 100.

If the customer 302 (FIGS. 3-6) does not have the vendor's receipt as determined in block 812, the customer is asked to provide relevant money card purchase information in block 814. The money card purchase information may include:

1. Country where it was purchased.
2. State where it was purchased.
3. City where money card 100 was purchased.
4. Location where money card 100 was purchased, which may be a street address, shopping center name or a more generalized location.
5. Vendor Name where money card 100 was purchased.

6. Date when money card 100 was purchased.
7. Approximate time when money card 100 was purchased (parameters would be provided by the clearing house).
8. Original money card 100 value at the time of purchase.
9. Money card 100 currency type, such as American or Canadian dollars, pesos, pounds, yen, marks, francs, euro dollars, etc.

The number of questions asked will typically depend on the security level assigned to the money card when it was purchased or be based on the value of the money card 100. After the questions in blocks 814 or 816 have been properly answered, the clearinghouse 112 verifies the information in block 818 and determines whether the process should proceed.

If the customer 302 (FIGS. 3-6) has initiated this process as a cardless purchase, as determined in block 820, the customer 302 (FIGS. 3-6) is required to provide his or her authentication information (PIN, PIC or biometric information) in block 824. If the authentication information is correct, the authentication process is then complete in block 826 and the transaction is completed as previously described. If, however, the customer 302 (FIGS. 3-6) has not initiated this process as a cardless purchase and has instead lost his or her PIN, as determined in block 820, the clearinghouse 112 provides the PIN to the customer 302 (FIGS. 3-6) in block 822. The authentication process is then complete in block 826.

The clearinghouse 112 may utilize the aforementioned sequence of questions, a combination thereof, or any other pertinent data that the clearinghouse 112 deems necessary. These questions should be presented individually and in a random order by the clearinghouse 112 to lessen the likelihood that perpetrators would outguess the system. The aforementioned questions are just a sampling of what the clearinghouse 112 could ask the customer 302 (FIGS. 3-6) who does not have his PIN. Additionally, the clearinghouse 112 should also consider increasing the number of questions as the dollar amount of the money card 100 increases.

If the money card 100 was secured with a biometric and subsequently lost, the customer 302 (FIGS. 3-6) would provide the biometric at a dispensing agent location 304 (FIG. 3) where the lost money card number would be once again revealed to the customer 302 (FIGS. 3-6) for a nominal fee.

After answering the sequence of questions, if the information that the customer 302 (FIGS. 3-6) provided is correct, his or her card number would appear on the screen and he or she could still use his money card 100 to make purchases. Should the information provided be incorrect, the customer 302 (FIGS. 3-6) would get two more attempts at retrieving his money card number. After three failed attempts, or any number the clearinghouse 112 deems appropriate, the customer 302 (FIGS. 3-6) would be informed that the information he provided was invalid and would be disconnected. At this time, the clearinghouse 112 would preclude the customer 302 (FIGS. 3-6) from any further attempts at retrieving the PIN and "red flag" the corresponding money card number on its system. The customer 302 (FIGS. 3-6) would then be advised to visit a dispensing agent in person and provide proper identification. If the customer 302 (FIGS. 3-6) calls the clearinghouse's telephone number, he or she would have to answer the same information. Money cards would preferably expire twelve (12) months after they had been activated, a time period specified in the customer/merchant agreement terms, or a time period specified by the law.

In certain embodiments, the money card system may utilize an identity verification information feature. This may be the same as or include the authentication information, such as when biometric data is required for authentication, so that the proper identity of the user is verified during the authentication. The authentication information may not be personalized; however, so that verification of a person's identity is not included in the authentication information. Thus, a transaction may be completed by any individual, without identity verification, as long as the PIN, PIC or authentication information is known by the individual.

A variety of reasons can exist for providing identity verification information with the money card system. The customer may want his or her identity linked to the money card. The merchant may also want or need to verify the customer's actual identity or other selected individual status, such as birth date, residence, citizenship, membership, etc., as a prerequisite to conducting a transaction, or it may be necessitated by law.

Reasons for the customer wanting his or her identity linked to the money card may be to benefit from promotional incentives, such as reward points for using the money card, or as an added protection feature to prevent the unauthorized use of the money card.

Merchants who deal in goods that cannot be sold to minors, such as alcohol and tobacco, may need to verify the customer's age. Merchants of firearms may want to prevent sales of firearms to convicted felons. The use of the money card system with criminal background information may thus eliminate the need for criminal background checks that are commonly employed today in such purchases. Additionally, merchants may want to collect status information on customers for marketing research purposes. Pharmacies may need to verify a person's identity or status to distribute prescription drugs. In these situations, the customer would need to prove his or her actual identity or a selected individual status at the time the money card is purchased or when the customer purchases those goods that require identity verification.

When verification of a customer's identity is required, the customer would present identification, such as a driver's license, government I.D., biometric, matricula consular, passport, or other form of accepted proof of actual identity or identity status. The identity verification may be swiped, scanned, manually entered or a biometric reading could be taken. Because proof of identification is not currently a prerequisite for purchasing most goods, an additional fee could be charged to the customer for adding an identity verification feature on the money card.

The identity verification feature of the money card may be added at the time that the money card is purchased or afterwards, such as when the customer is using the money card to purchase goods or obtain services. Should the customer choose to add the identification verification feature at the time of the purchase of the money card, the identity verification feature would be added and sent or transmitted to the clearinghouse. This could be done during the activation request for the money card or as a separate step. The identity verification information would be encrypted when transmitted to the clearinghouse. If a fee is charged for the identity verification feature, this could be deducted from the amount of funds available, for payment to the clearinghouse and/or vendor.

The identity verification information may be required again during the merchant transaction. This provides an added protection to the user for unauthorized use of the money card. In instances where the customer did not obtain the identity verification during the vending operation, the customer may subsequently obtain the identity verification feature. Thus, when the customer discovers that a merchant requires proof of identity, he or she may add the identity verification feature to the money card. As an example, after the customer submits his or her money card or money card number and authentication information, they would then validate their identity via a magnetic stripe reader, a UPC scanner, biometric scan or manual entry. The entire information module would be encrypted and transmitted to the merchant, which would attach the sales amount and a merchant control or identification profile to the encrypted file. The entire encrypted transaction would be transmitted to the clearinghouse during the transaction request. The clearinghouse may charge a fee to the customer and reduce the credit balance for the money card for the identification verification and also for the transaction amount.

In the various embodiments described, revenue can be derived from the money card system in a variety of manners. A fee for issuance of the money card or the identity verification may be charged to the customer. Lost or stolen money card recovery fees and reload fees may also be charged to the customer. Other financial benefits may also be derived. These may include the benefit of a float between the vending of the money card and its use. Advertising revenue and demographics-based advertising revenue may also be derived.

Other advantages may also be derived from the money card system. Businesses may now have access to those that typically engage in cash-only transactions or that do not possess credit or debit cards. The cards may be used by individuals that may have significant spending power, such as teenagers, but do not have established credit. Those that may have credit or debit cards, but do not want to use them because of identity theft concerns may also find the money card useful. The merchant also benefits because they have a quick and reliable transfer of funds from the transaction. Online transactions are facilitated to all consumers without discrimination because of their financial status or credit history. Online transactions may also be carried out that might not otherwise be conducted out without the money card.

While specific alternatives to steps of the invention have been described herein, additional alternatives not specifically disclosed but known in the art are intended to fall within the scope of the invention. Thus, it is understood that other applications of the present invention will be apparent to those skilled in the art upon the reading of the described embodiment and a consideration of the appended claims and drawings.

The invention claimed is:

1. A system for providing and utilizing a money order device comprising;

a vending unit that creates and transmits an encrypted activation request containing a record of funds paid, authentication information from a customer and money order account information and provides a money order device during the money order device vending operation upon a payment of the funds;

a vending communication link through which the encrypted activation request is transmitted;

a clearinghouse that is remote from the vending unit that receives the encrypted activation request through the vending communication link and creates an account for the money order and stores the authentication information, the money order account information and an amount of account funds available based upon the funds paid in a database of the clearinghouse and transmits an activation response to the vendor unit to allow the vending unit to provide the money order device, and receives an encrypted transaction request during a merchant transaction operation, the encrypted transaction request including the money order account information, authentication information provided from the customer and a transaction amount; and a merchant communication link for transmitting the request from the merchant unit to the clearinghouse; and wherein the clearinghouse determines whether to approve the transaction by verifying the account information, the authentication information and transaction amount with money order account information stored in the clearinghouse database, and determines whether the transaction amount exceeds the amount of account funds available for the money order, and transmits a transaction response to the merchant unit of approval or disapproval of the transaction and upon approval of the transaction, immediately transfers money order account funds from the clearing house to a merchant account of the merchant.

2. The system of claim 1, wherein:

the authentication information includes identity verification information.

3. The system of claim 1, further comprising:

identity verification information is received during at least one of the vending operation and the merchant transaction operation.

4. The system of claim 3, wherein:

the identity verification information is transmitted through at least one of the vending communication link during transmission of the activation request or the merchant communication link during transmission of the transaction request.

5. The system of claim 3, wherein:

the identity verification information is provided only during the merchant transaction operation.

6. The system of claim 3, wherein:

the identity verification information is provided only during the vending operation.

7. The method of claim 3, wherein:

the system verification information is provided in both the vending operation and the merchant transaction operation.

8. The system of claim 3, wherein:

providing the identity verification information is selected as an option by the customer during the vending operation.

9. The system of claim 3, wherein:

providing the identity verification information is an option selected by the merchant during the merchant transaction operation.

10. The system of claim 3, wherein:

the identity verification information includes at least one of a user's actual identity or a selected status.

11. A method of conducting a monetary transaction comprising:

in a money order device vending operation:

receiving a transmitted encrypted activation request from a vendor through a vendor communication link upon obtaining a payment of funds and authentication information provided from a customer at a remote money order device vendor location, the encrypted activation request containing a record of the funds paid, the authentication information and money order account information;

creating a clearinghouse account for the money order and storing the authentication information, the money order account information and an amount of account funds available based upon the funds paid in a clearinghouse database; and transmitting an activation response to the vendor to activate the money order device associated with the created account provided to the customer at the vending location; and in a merchant transaction operation:

receiving an encrypted transaction request that includes money order account information, authentication information provided from the customer and a transaction amount when the money order device is provided to a merchant that is transmitted via a merchant communication link:

determining whether to approve the transaction by verifying the account information, the authentication information and transaction amount with money order account information stored in the clearinghouse database, and determining whether the transaction amount exceeds the amount of account funds available for the money order device;

transmitting a transaction response of approval or disapproval of the transaction to the merchant;

upon approval of the transaction, immediately transferring money order account funds to a merchant account of the merchant.

12. The method of claim 11, wherein:
the authentication information is that obtained from a customer selected from one or more of a plurality of different authentication information options.

13. The method of claim 11, wherein:
the authentication information includes a personal identification number or code, a fingerprint, handprint, voice print, iris scan, retina scan, thermal image, electronic or digital signature.

14. The method of claim 11, wherein:
the authentication information is biometric data.

15. The method of claim 11, wherein:
the money order device is an account number.

16. The method of claim 11, wherein:
the activation request is provided by a microprocessor.

17. The method of claim 11, wherein:
the money order device activated is a card containing encoded data.

18. The method of claim 11, wherein:
additional payment options are provided to the customer upon disapproval of the transaction.

19. The method of claim 11, wherein:
the merchant transaction operation is a C.O.D. transaction.

20. The method of claim 11, wherein:
the transaction request and transaction response are received via a global computer network.

21. The method of claim 11, wherein:
the vendor is one of an automated teller machine, a vending machine or a merchant.

22. The method of claim 11, further comprising:
receiving identity verification information that is transmitted during at least one of the vending operation and the merchant transaction operation.

23. The method of claim 22, wherein:
the identity verification information is received during at least one of the transmission of the activation request or transmission of the transaction request.

24. The method of claim 22, wherein:
the identity verification information is received only during the merchant transaction operation.

25. The method of claim 22, wherein:
the identity verification information is received only during the vending operation.

26. The method of claim 22, wherein:
the identity verification information is received in both the vending operation and the merchant transaction operation.

27. The method of claim 22, wherein:
the received identity verification information is that selected by the customer during the vending operation.

28. The method of claim 22, wherein:
the received identity verification information is that selected by the merchant during the merchant transaction operation.

29. The method of claim 22, wherein:
the identity verification information is received while receiving at least one of the encrypted activation request and the encrypted transaction request.

30. The method of claim 12, further comprising
identity verification information is received during at least one of the vending operation and the merchant transaction operation.

31. The method of claim 22, wherein:
a fee is charged for transmitting or receiving the identity verification information.

32. The method of claim 22, wherein:
the identity verification information includes at least one of a user's actual identity or a selected status.

33. The method of claim 11, wherein:
the authentication information includes identity verification information.

* * * * *